United States Patent

[11] 3,569,668

[72] Inventor Carl B. Carlisle
 8716 Hurst Ave., Savannah, Ga. 31406
[21] Appl. No. 843,722
[22] Filed July 22, 1969
[45] Patented Mar. 9, 1971

[54] WATER HEATING AND STORAGE TANK
 2 Claims, 8 Drawing Figs.
[52] U.S. Cl........................................................ 219/316,
 122/233, 219/312, 219/320
[51] Int. Cl........................................................ H05b 1/00
[50] Field of Search............................................. 219/310,
 312, 314, 315, 316, 318, 320; 126/362; 122/233,
 234

[56] References Cited
 UNITED STATES PATENTS
 1,823,803 9/1931 Leland, Jr...................... 122/233
 3,103,575 9/1963 Pecci............................. 219/314X

*Primary Examiner*—J. V. Truhe
*Assistant Examiner*—C. L. Albritton
*Attorney*—Albert H. Kirchner ABSTRACT: A liquid heater, typically a household hot water heating and storage tank, is of cylindrical shape, horizontally disposed, with an inlet near the bottom at one end and an outlet near the top at the opposite end, and with heating means, either electrical or gas-burner, between the inlet and outlet, in or on a lower side quadrant of the tank interior, so as to generate circulation of the liquid by convection currents around the inside tank wall surface.

PATENTED MAR 9 1971
3,569,668
SHEET 1 OF 2
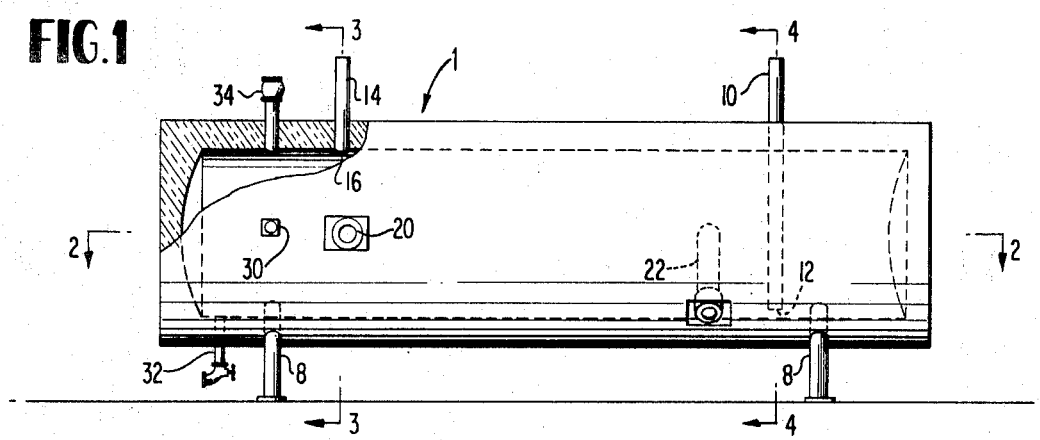
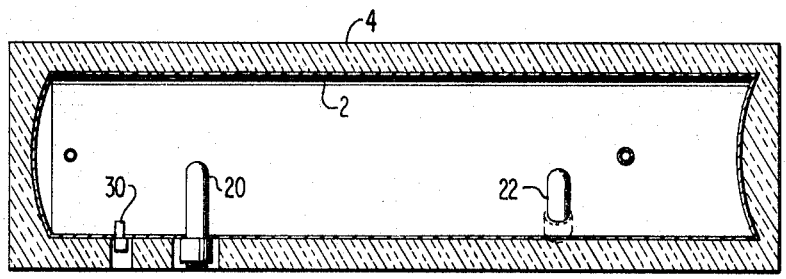
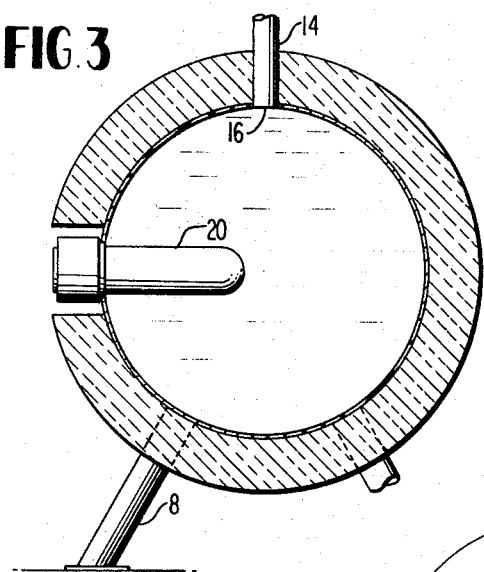
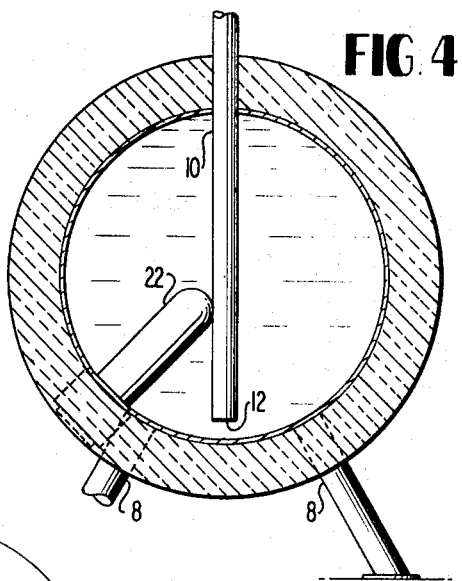
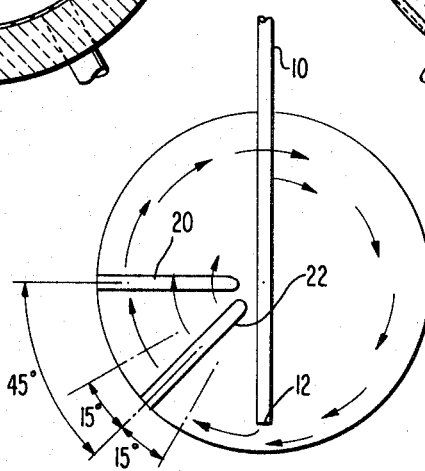
INVENTOR
CARL B. CARLISLE
BY Albert H. Kirchner
ATTORNEY

PATENTED MAR 9 1971 3,569,668

INVENTOR
CARL B. CARLISLE

BY Albert H. Kirchner

ATTORNEY

WATER HEATING AND STORAGE TANK

DESCRIPTION OF THE PREFERRED EMBODIMENTS

The present invention relates to liquid heating, especially but not exclusively to domestic hot water heating tanks of the kind universally used in dwelling houses for heating and storing the household tap water.

The principal objects of the invention are to provide a tank of the general type indicated which will be simple in construction and highly efficient in utilizing the heat input and which will require only a minimum of space at a convenient location in, for example, a household cellar, attic, utility room or the like.

Generally speaking, these objects are attained by enclosing the liquid to be heated in a tank which has an interior wall surface that is curved, i.e., is circular in cross section as in a cylindrical tank which is mounted on a horizontal axis, with the liquid inlet orifice in a lowermost zone at one end portion of the tank and the discharge outlet in an uppermost zone at the opposite end portion of the tank, and with heating means located in the longitudinal space between the inlet and discharge at one side of a longitudinal plane vertically bisecting the tank and below, or at least no higher than, a longitudinal plane horizontally bisecting the tank, i.e., in a lower quadrant of the tank, so that the liquid which is raised to the highest temperature by contact with the heating means is the liquid which is nearest an upwardly and outwardly curving wall surface and so that this heated liquid will rise along that wall surface and thence generate a convection current circularly around the top and far side of the tank interior for recirculation back into repeated contact with the heating means for ultimate heating of the whole tank contents to substantially uniform temperature.

While the invention will be explained hereinafter in terms of its embodiment in a household water heating and storage system, it is to be understood that the inventive principles incorporated in the water heating tank structure are equally applicable to tank structures designed for industrial, commercial and manufacturing uses in which efficient heating and storing of any liquid is required.

THE DRAWINGS

In the accompanying drawings, which illustrate certain presently preferred embodiments of the invention:

FIG. 1 is a side elevational view of a tank constructed according to the invention, using electrical heating means;

FIG. 2 is a horizontal cross-sectional view taken along the line 2—2 of FIG. 1;

FIG. 3 is a vertical cross-sectional view taken along the line 3—3 of FIG. 1;

FIG. 4 is a similar view taken along the line 4—4 of FIG. 1;

FIG. 5 is a diagrammatic view in vertical cross section illustrating certain tolerances and convection currents;

Figure 6:
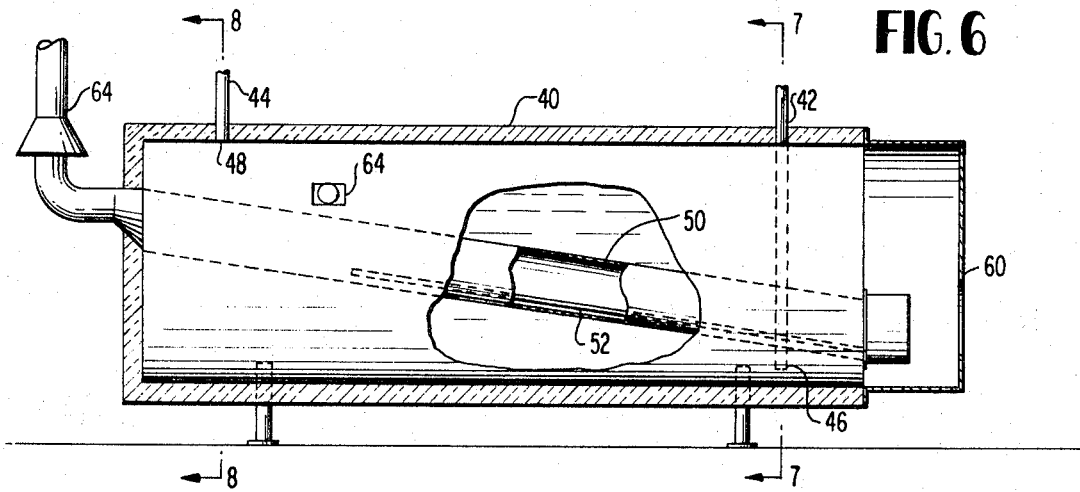
FIG. 6 is a vertical longitudinal cross-sectional view showing a structural modification employing gas-burner heating means.

In these FIGS., the reference numeral 1 designates generally a tank of cylindrical shape, made of suitable metal such as iron or steel, or of glass or other desirable noncorrosive material, and properly insulated to minimize heat loss, as is customary in liquid heating and storing tanks.

The details of the tank structure insofar as the tank shell is concerned form no part of the present invention but may be conventional and hence will not further be described and are shown in the drawings in largely diagrammatic fashion, comprising an internal lining 2 of liquid-inert material, e.g., glass, monel metal, stainless steel or the like, an an outer jacket 4 of suitable insulation surfaced by some appropriate finishing material (not shown).

The tank is cylindrical, with closed ends, and is disposed horizontally as shown, i.e., with its longitudinal axis extending parallel to the floor surface if the tank is mounted on short legs 8 standing on the floor as shown in FIG. 1, or similarly parallel to the room ceiling if the tank is suspended therefrom in an elevated position.

An inlet pipe 10 is located in one end portion of the tank, penetrating the tank wall in its highest area, i.e., in the central longitudinal vertical plane of the cylinder, containing therein as a straight section of pipe and terminating in an orifice 12 in the lower zone of the tank, very near the bottom, and in the same central plane of the cylinder.

An outlet or discharge pipe 14 is located in the opposite end portion of the tank, penetrating the tank wall in its highest area, coplanar with the inlet pipe in the central longitudinal vertical plane of the cylinder, and terminates in an effluent opening 16 in the uppermost portion of the tank, i.e., substantially in the plane of the inner wall surface.

In the embodiment of the invention illustrated in FIGS. 1—5, heat is supplied to water (or other liquid) in the tank by electrical heating elements. These are best provided in the form of resistance elements of conventional type in the form of rodlike members 20, 22 mounted in the tank wall and radially instanding therefrom, as best shown in FIGS. 3 and 4. As also appears in those FIG., each of these elements is positioned entirely at one side of the vertical central plane of the tank and in or below the horizontal central plane thereof, That is to say, in the embodiment shown, there are two elements. A greater number could be used, as in a longer tank or one of greater volume. But it is important that the elements, which constitute the source of heat for the liquid and hence make hottest the liquid immediately contacting them, be confined to one side of the tank interior and that none of the elements extend appreciably above the horizontal midplane of the tank. Thus in the illustrated embodiment substantially all the heating surface area of the elements 20 and 22 alike is located in a quadrant of the tank interior which is below the longitudinal central horizontal plane of the tank and at one side of the longitudinal central vertical plane thereof, i.e., in the lower left-hand quadrant as viewed in FIGS. 3 and 4.

The effect of this location of the heating elements is indicated in the diagrammatic showing in FIG. 5. The liquid (typically water and hereinafter so designated), heated by direct contact with the heating element surfaces, rises directly therefrom in a circular path as constrained by the upwardly and inwardly curving sidewall of the tank, passing to the top of the tank interior and then down along the opposite side and across the bottom for repetition of the cycle. This path is most pronounced in the immediate plane of each element. In between the elements and particularly also in the zone of the inlet pipe and the zone of the outlet pipe, the path will be somewhat distorted by incoming and discharging water. However, the substantially constant convection pattern generated by the heating surfaces is generally like that shown by the arrows in FIG. 5, being rotational around the tank wall, up along the side where the heating elements are located, and down along the opposite side.

Thus the tank contents are kept in motion as long as the elements remain heated and continue to perform their heating function, so that in time the entire contents become raised to a relatively uniform temperature.

The precise angular setting of the elements is not critical. I prefer to locate one or more of them in substantially the horizontal midplane of the tank, as shown at 20, and to locate the other, or others, midway between that plane and the vertical midplane of the tank, or at an angle of 45° as shown in FIG. 5. However, it is possible to obtain good results with the angle anywhere within a range of some 15° on either side, above or below the preferred 45° setting, as shown in the FIG.

The electrical heating elements are energized by conventional circuits (not shown), which may include a thermostatic control 30, and the tank may be provided with a bottom drain fitting 32 and the usual safety valve 34.

Figure 7:
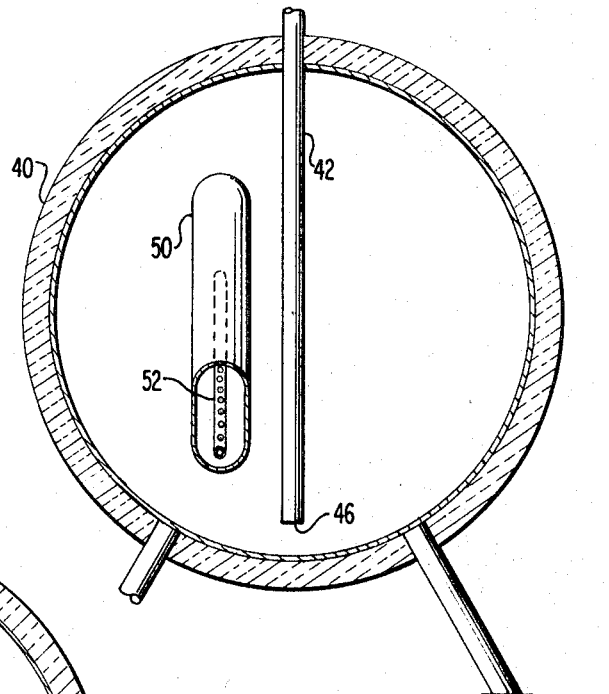
FIG. 7 is a vertical cross-sectional view taken along the line 7—7 of FIG. 6.
Figure 8:
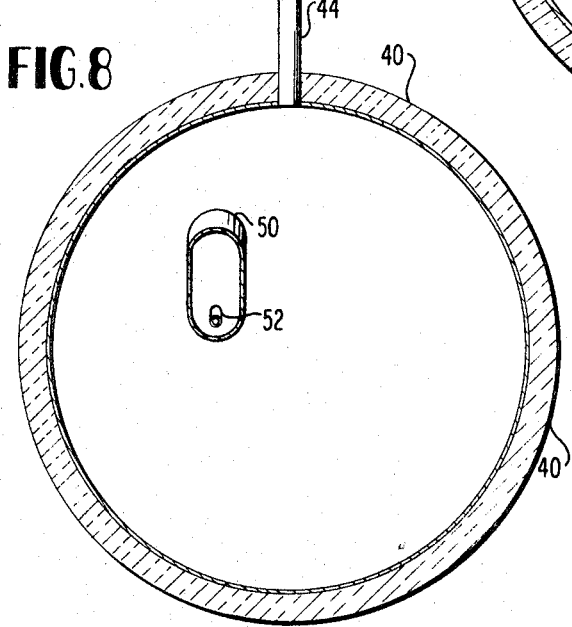
FIG. 8 is a vertical cross-sectional view taken along the line 8—8 of FIG. 6.

FIGS. 6—8 show a gas-fired modification of the structure shown in FIGS. 1—5. In this embodiment the tank 40, inlet pipe 42, discharge pipe 44 and pipe openings 46 and 48 are the same as their counterparts in the electrically heated form of the invention. However, instead of the electrical elements, gas-burner means is provided. This may take the form of an elongated tubular shell 50 containing a burner 52 connected to suitable gas supply mains (not shown) and constituting a firebox and flue unit. The unit is positioned in the tank interior, at one side of the central longitudinal vertical plane of the tank, as seen in FIGS. 7 and 8, and with at least the major portion of the unit below the central longitudinal horizontal plane of the tank, as seen in FIG. 6. Thus the source of heat in this form of the invention is confined substantially to the quadrant of the tank interior which is at one side of center and below the horizontal midplane, as in the electrical embodiment.

The convection of the currents produced by the gas-burner unit is substantially the same as has been explained in connection with the electrical embodiment, i.e., the heated water rises along the tank wall surface at the left-hand side in FIG. 8, then across the top of the tank interior and down the right-hand side for recirculation and reheating as the cycle is repeated.

A suitable housing 60 at the end of the tank adjacent the lower end of the burner unit may be provided for containing gas flow valves, pilot light, etc., and the unit may have appropriate venting chimney means 62 at its other end, as shown.

The same adjuncts, including a thermostat 64, supporting legs, drain valve, etc., will of course be included in the gas-fired embodiment.

It is believed that those skilled in the art will adequately understand the principles of the invention, and the best mode of practicing it, from the foregoing description and accompanying illustrations of the presently preferred embodiments, and will understand that such embodiments are given by way of exemplification only and that the principles of the invention are capable of being incorporated in other and further modified forms within the scope of the appended claims.

I claim:

1. A liquid heater comprising a generally cylindrical tank, means supporting the tank with its axis in substantially horizontal position, a liquid input pipe having an opening in the lowest portion of the tank at one end thereof, a liquid discharge pipe having an opening in the uppermost portion of the tank at the opposite end thereof, and heating means located in the tank between the pipe openings and confined to a lower quadrant of the tank interior at one side of the vertical central plane of the tank and below the horizontal central plane thereof, said heating means comprising a plurality of electric heating units mounted in the tank wall and projecting radially into the tank interior, at least one of said units projecting into the tank at an angle of substantially 45° to the vertical, whereby liquid heated by contact with said means will ascend into the directly upper quadrant and then move down through the two quadrants on the opposite side of the tank for recirculation through said first named quadrant and reheating therein.

2. A liquid heater as claimed in claim 1 in which one of said units projects into the tank in substantially the horizontal diametric plane of the tank.